Patented May 19, 1953

2,639,218

UNITED STATES PATENT OFFICE 2,639,218

PRODUCTION OF ANHYDROUS ZIRCONIUM FLUORIDE

Raymond J. Anderson, Midland, Mich., assignor to The Dow Chemical Company, Midland, Mich., a corporation of Delaware No Drawing. Application September 13, 1950, Serial No. 184,717

4 Claims. (Cl. 23—88)

This invention relates to the production of anhydrous zirconium fluoride.

The recent discovery that the incorporation of zirconium in magnesium-base alloys improves their characteristics has led to a study of various zirconium salts to determine their effectiveness as agents for alloying zirconium with magnesium. It has been found that anhydrous zirconium fluoride, in contrast even to hydrated zirconium fluorides, is unique in that it will produce zirconium concentrations in magnesium as high as 0.5 per cent. This finding has created an unprecedented demand for the anhydrous salt.

Hydrated forms of zirconium fluoride and zirconyl fluoride have been known for over a century (Berzelius, Pogg. Ann. 4, 117 (1825); Marignac, Ann. Chim. Phys. (3) 60, 275 (1860); Chauvenet, Compt. Rend. 164, 727 (1917); Prideaux and Roper, J. Chem. Soc. 129, 898 (1926)). However, Marignac, Chauvenet, and Prideaux and Roper agree that hydrated forms cannot be converted to the anhydrous salt by simple heating. For that reason, the anhydrous compound has heretofore been made by the method of Wolter (Chem. Ztg. 32, 606 (1908)), involving a reaction between anhydrous zirconium tetrachloride and anhydrous hydrogen fluoride. This method is disadvantageous in that the starting materials are expensive, hygroscopic, and somewhat hazardous.

It is therefore the principal object of the present invention to provide a simple, inexpensive method of making anhydrous zirconium fluoride. More specific objects and advantages are apparent from the description, which illustrates and discloses, but is not to be construed as limiting the invention.

According to the invention anhydrous zirconium fluoride is produced by a three step method. Step one involves subjecting zirconium oxide or zirconyl chloride to the action of hydrofluoric acid until essentially complete reaction is effected between the zirconium compound and HF; step two involves heating the resulting products to dryness; and step three involves calcining the dried products to produce anhydrous zirconium fluoride. It is usually preferred that the hydrogen fluoride be provided as aqueous hydrofluoric acid, most desirably one that contains from 30 to 70 per cent of hydrogen fluoride. (The terms "per cent" and "parts" are used herein to refer to per cent and parts by weight, unless otherwise indicated.)

It is essential that step one of the process of the invention be carried out in such a way that fluorination of the zirconium compound is substantially complete, in order to avoid side reactions during steps two and three. Accordingly, it is important to use at least the amount of hydrogen fluoride theoretically required to convert the zirconium oxide or zirconyl chloride to zirconium tetrafluoride, and preferred to use an excess (e. g., from 4.2 to 4.4 mols of HF per mol of zirconium). A relatively extended reaction time and an elevated temperature are also desired (e. g., a reaction of from four to six hours at a temperature between 60° C. and 80° C. is satisfactory). The optimum reaction time and temperature for any batch of a zirconium compound are conveniently determined experimentally, but are usually within the ranges indicated above. An aqueous slurry of hydrated $ZrF_4$ remains after reaction.

Any of many commercial grades of zirconium oxide or zirconyl chloride (preferably an oxide) can be used in the practice of the invention. It is ordinarily desired that the material employed be one that has not previously been calcined to a high temperature (i. e., that it be a reactive zirconium compound), as such calcining substantially decreases the reactivity with aqueous hydrofluoric acid. It is advantageous to use a relatively pure zirconium compound, as the usual impurities (e. g., silica) ordinarily are not entirely removed in the course of the process. A particularly advantageous source of zirconium oxide is the product sold under the trade name of "Insuloxide"; this material contains about 95.5 per cent of zirconium oxide and about 3.8 per cent of silica.

It is important, in carrying out step two of the process of the invention, that the slurry resulting from step one be heated at a relatively low temperature until all the water is vaporized, and the residue is dry to the touch. This can be accomplished conveniently by placing the slurry in an open vessel (i. e., one from which water vapor can escape) and heating the walls thereof to a temperature between 120 and 170° C., most desirably between 140 and 160° C. Alternatively, the slurry can be placed in an oven maintained at a comparatively high temperature (e. g., as high as 500° C.); under such conditions, the water of the slurry and the water of hydration prevent over-heating before sensible dryness is achieved. The sensibly dry material is identified as $ZrF_4 \cdot XH_2O$, and is believed to be the monohydrate.

In some instances it may be possible to carry out the calcining operation (step three) at a temperature as low as about 275° C. It is preferred, however, to use a higher temperature (e. g., at least about 300° C.) so that calcining is completed in a reasonable time. Although essentially pure anhydrous zirconium fluoride has been produced by calcining for one hour at 300° C. a product dried as described above, more nearly uniform results are achieved by employing a temperature between 300° C. and 350° C. and a time of from four to five hours. Calcining for five hours at 350° C. is most preferred. Any higher temperature below that at which substantial sublimation of zirconium tetrafluoride occurs can be used.

The following examples illustrate preferred embodiments, but are not to be construed as limiting the invention:

*Example 1*

Anhydrous zirconium fluoride was produced according to the following procedure:

"Insuloxide" (387 grams) and 60 per cent aqueous hydrofluoric acid (440 grams) were mixed in a polystyrene bottle and maintained at 70° C. for five hours. The resulting reaction mixture was heated to dryness on a sand bath maintained at 150° C. The total recovery of dried product amounted to 539.6 grams. Five 100 gram samples of this dried product were subjected to different calcining procedures as described below:

One sample was heated at 250° C. for four hours. At the end of this time it was determined by X-ray diffraction that the product remained substantially pure $ZrF_4 \cdot XH_2O$ (the product obtained after drying at 150° C.). A 95.4 gram sample of this product was then heated at 275° C. for an additional four hours. The material remained substantially pure $ZrF_4 \cdot XH_2O$ (according to analysis by X-ray diffraction), but the appearance of a trace of a new phase, believed to be anhydrous zirconium tetrafluoride, was noted.

The other four 100 gram samples of the dried product were calcined under differing conditions: the first was calcined at 350° C. for 68 hours; the second at 350° C. for 5½ hours; the third at 400° C. for four hours; and the fourth at 450° C. for four hours. In each instance the calcined product was determined by X-ray diffraction to be essentially pure anhydrous zirconium tetrafluoride, although the presence of extremely small amounts of an unidentified phase was also noted.

*Example 2*

70 grams of a zirconium oxide sold under the trade name "Opax" (which contained 87.97 per cent $ZrO_2$, 8.49 per cent $SiO_2$, 1.30 per cent $Na_2O$, and 1.50 per cent $Al_2O_3$) and 91.7 grams of 48 per cent aqueous hydrofluoric acid were mixed and maintained at 70° C. for five hours. The resulting reaction mixture was heated to dryness on a sand bath maintained at 150° C. The total recovery of dried product amounted to 97.2 grams; this material was calcined at 300° C. for six hours. The resulting product was found by X-ray diffraction to be essentially pure anhydrous zirconium tetrafluoride plus a trace of zirconium oxide.

*Example 3*

Zirconyl chloride (148.5 grams of a sample comprising the octahydrate, and containing 30.73 per cent of zirconium) and 48 per cent aqueous hydrofluoric acid (91.7 grams) were mixed and maintained at 70° C. for five hours. The resulting reaction mixture was heated to dryness on a sand bath maintained at 150° C., and the dried material was then calcined at 300° C. for six hours. The resulting product was found by X-ray diffraction to be essentially pure anhydrous zirconium tetrafluoride.

*Example 4*

"Insuloxide" (a total of 96.8 grams) was added stepwise over a period of 30 minutes to 110 grams of 60 per cent aqueous hydrofluoric acid, and the resulting mixture was maintained at 70° C. for five hours. The slurry which resulted was transferred to a nickel crucible and placed in an oven maintained at 450° C. The water was evaporated within 20 minutes in the oven, leaving a sensibly dry powder in the crucible; after one hour in the oven the sample was removed and found by X-ray diffraction to be essentially pure anhydrous zirconium tetrafluoride.

We claim:

1. A method of producing anhydrous zirconium fluoride that comprises (1) subjecting a reactive zirconium oxide to the action of from 30 to 70 per cent aqueous hydrofluoric acid containing from 4.2 to 4.4 mols of HF per mol of zirconium oxide at 60 to 80° C. for from four to six hours; (2) heating the resulting products to dryness at from 140 to 160° C.; and (3) calcining the dried products at 300 to 350° C. for from four to five hours to produce anhydrous zirconium fluoride.

2. A method of producing anhydrous zirconium fluoride that comprises (1) treating a member of the group consisting of zirconium oxide and zirconyl chloride with an excess of aqueous hydrofluoric acid of 30 to 70 percent concentration until all the zirconium compound is fluorinated, (2) heating the resulting product at about 120° to 170° C. until it is sensibly dry, and (3) calcining the dried product at a temperature between about 300° C. and its sublimation temperature to convert the dried product to anhydrous zirconium fluoride.

3. A method of producing anhydrous zirconium fluoride that comprises (1) heating an aqueous solution of zirconium fluoride containing hydrofluoric acid at a temperature of from about 120° to 170° C. until it is sensibly dry, and (2) calcining the dried product at a temperature between about 300° C. and its sublimation temperature to convert it to anhydrous zirconium fluoride.

4. A method according to claim 3 wherein the aqueous solution of zirconium fluoride contains hydrofluoric acid in a proportion such that the atomic ratio F:Zr in the solution is between about 4.2 and 4.4.

RAYMOND J. ANDERSON.

References Cited in the file of this patent

UNITED STATES PATENTS

| Number | Name | Date |
|---|---|---|
| 2,602,725 | Wilhelm et al. | July 8, 1952 |

OTHER REFERENCES

J. W. Mellor's "A Comprehensive Treatise on Inorganic and Theoretical Chemistry," vol. 7, pages 123, 137, 144, Longmans, Green and Co., N. Y., publishers.

"Handbook of Chem. and Physics," 28th ed., by C. D. Hodgman, pp. 490–491, Chem. Rubber Publishing Co., Cleveland.

"Dictionary of Applied Chemistry," by Thorpe, vol. 5, pages 828, 829; 1916 ed., Longmans, Green and Co., N. Y.

"Treatise on Chemistry" by Roscoe and Schorlemmer, vol. 2, page 807; 1907 ed., MacMillan and Co., Ltd., London.

"Modern Inorganic Chemistry," by J. S. Mellor, page 712, revised 1939 ed., Longmans, Green and Co., N. Y.

U. S. Atomic Energy Commission Report I. S. C., 151, by L. J. Abate et al., "Sublimation of Zirconium Tetrafluoride."